US007612859B2

(12) United States Patent  
Clark et al.

(10) Patent No.: US 7,612,859 B2
(45) Date of Patent: Nov. 3, 2009

(54) ULTRA-VIOLET RADIATION ABSORBING GRID

(75) Inventors: Benjamin L. Clark, Corvallis, OR (US); Sadiq S. Bengali, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 57 days.

(21) Appl. No.: 11/263,525

(22) Filed: Oct. 31, 2005

(65) Prior Publication Data

US 2007/0097292 A1    May 3, 2007

(51) Int. Cl.
G02F 1/1339    (2006.01)
G02F 1/1333    (2006.01)
(52) U.S. Cl. ................. 349/156; 349/110; 349/157
(58) Field of Classification Search ............ 349/70, 349/71, 110, 155–157
See application file for complete search history.

(56) References Cited

U.S. PATENT DOCUMENTS

| | | | |
|---|---|---|---|
| 4,822,144 A | 4/1989 | Vriens | |
| 4,833,542 A | 5/1989 | Hara et al. | |
| 4,882,617 A | 11/1989 | Vriens | |
| 4,980,774 A | 12/1990 | Brody | |
| 5,128,785 A | 7/1992 | Yoshimoto et al. | |
| 5,146,355 A | 9/1992 | Prince et al. | |
| 5,187,604 A * | 2/1993 | Taniguchi et al. ........... | 349/152 |
| 5,296,954 A | 3/1994 | Ichimura et al. | |
| 5,353,133 A | 10/1994 | Bernkopf | |
| 5,414,545 A | 5/1995 | Lee | |
| 5,420,706 A * | 5/1995 | Yamazaki et al. ........... | 349/110 |
| 5,490,002 A | 2/1996 | Nicholas | |
| 5,498,498 A * | 3/1996 | Uchikawa et al. ........... | 430/7 |
| 5,510,915 A | 4/1996 | Ge et al. | |
| 5,523,769 A | 6/1996 | Lauer et al. | |
| 5,535,026 A * | 7/1996 | Fujimori et al. ............ | 349/89 |
| 5,563,432 A | 10/1996 | Miura et al. | |
| 5,625,473 A | 4/1997 | Kondo et al. | |
| 5,629,783 A | 5/1997 | Kanbara et al. | |
| 5,666,174 A * | 9/1997 | Cupolo, III ................. | 349/64 |
| 5,715,026 A | 2/1998 | Shannon | |
| 5,717,474 A | 2/1998 | Sarma | |
| 5,726,728 A | 3/1998 | Kondo et al. | |
| 5,729,311 A | 3/1998 | Broer et al. | |
| 5,729,318 A | 3/1998 | Yamada et al. | |
| 5,731,857 A | 3/1998 | Neijzen | |
| 5,751,382 A | 5/1998 | Yamada et al. | |
| 5,751,479 A | 5/1998 | Hamagishi et al. | |
| 5,771,084 A | 6/1998 | Fujimori et al. | |

(Continued)

FOREIGN PATENT DOCUMENTS

EP    412497 A3    8/1990

(Continued)

OTHER PUBLICATIONS

MicroChem. "SU-8 Resists." Dec. 18, 2001 (http://web.archive.org/web/20011218185913/http://www.microchem.com/products/su_eight.htm).*

(Continued)

*Primary Examiner*—David Nelms
*Assistant Examiner*—Lauren Nguyen

(57) ABSTRACT

Various embodiments and methods relating to an ultra-violet radiation absorbing grid for attenuating transmission of near UV-light are disclosed.

31 Claims, 8 Drawing Sheets

U.S. PATENT DOCUMENTS

| | | |
|---|---|---|
| 5,784,134 A | 7/1998 | Fujimori et al. |
| 5,793,456 A | 8/1998 | Broer et al. |
| 5,805,117 A | 9/1998 | Mazurek et al. |
| 5,828,434 A * | 10/1998 | Koden et al. ............... 349/148 |
| 5,870,162 A | 2/1999 | Fujimori et al. |
| 5,872,607 A | 2/1999 | Yazaki et al. |
| 5,877,735 A | 3/1999 | King et al. |
| 5,889,614 A | 3/1999 | Cobben et al. |
| 5,899,551 A | 5/1999 | Neijzen et al. |
| 5,907,383 A | 5/1999 | Kurihara et al. |
| 5,929,956 A | 7/1999 | Neijzen et al. |
| 5,963,282 A | 10/1999 | Battersby |
| 6,042,237 A | 3/2000 | De Vaan et al. |
| 6,130,733 A | 10/2000 | Lowe |
| 6,218,774 B1 | 4/2001 | Pope |
| 6,232,937 B1 | 5/2001 | Jacobsen et al. |
| 6,233,029 B1 | 5/2001 | Iijima et al. |
| 6,281,960 B1 * | 8/2001 | Kishimoto et al. .......... 349/156 |
| 6,288,483 B1 * | 9/2001 | Haven et al. ............... 313/461 |
| 6,307,604 B1 | 10/2001 | Hikmet et al. |
| 6,320,633 B1 | 11/2001 | Broer et al. |
| 6,344,887 B1 | 2/2002 | Ma et al. |
| 6,501,520 B2 | 12/2002 | Nose et al. |
| 6,501,521 B2 | 12/2002 | Matsushita et al. |
| 6,507,385 B1 | 1/2003 | Nishiyama et al. |
| 6,618,104 B1 | 9/2003 | Date et al. |
| 6,654,079 B2 | 11/2003 | Bechtel et al. |
| 6,757,039 B2 | 6/2004 | Ma |
| 6,784,953 B2 | 8/2004 | Liang et al. |
| 6,787,275 B2 | 9/2004 | Kawase |
| 6,795,138 B2 | 9/2004 | Liang et al. |
| 6,819,393 B1 | 11/2004 | Date et al. |
| 6,831,712 B1 | 12/2004 | Stephenson et al. |
| 6,836,314 B2 | 12/2004 | Date et al. |
| 6,844,957 B2 | 1/2005 | Matsumoto et al. |
| 6,909,419 B2 | 6/2005 | Zavracky et al. |
| 2001/0026255 A1 * | 10/2001 | Sano et al. .................... 345/60 |
| 2001/0038426 A1 | 11/2001 | Bechtel et al. |
| 2001/0050528 A1 | 12/2001 | Sawada et al. |
| 2002/0036734 A1 | 3/2002 | Ichimura |
| 2002/0097358 A1 | 7/2002 | Ueki et al. |
| 2002/0118322 A1 | 8/2002 | Murade |
| 2002/0126238 A1 | 9/2002 | Matsushita et al. |
| 2002/0126249 A1 | 9/2002 | Liang et al. |
| 2003/0007112 A1 | 1/2003 | Matsushita et al. |
| 2003/0043316 A1 | 3/2003 | Matsumoto et al. |
| 2003/0142248 A1 | 7/2003 | Park et al. |
| 2003/0169387 A1 | 9/2003 | Liang et al. |
| 2003/0179321 A1 * | 9/2003 | Sakamaki ....................... 349/2 |
| 2003/0218712 A1 | 11/2003 | Kumar |
| 2003/0231266 A1 | 12/2003 | Ma |
| 2004/0004765 A1 | 1/2004 | Ihara et al. |
| 2004/0032561 A1 | 2/2004 | Kumar et al. |
| 2004/0105048 A1 | 6/2004 | Kyu et al. |
| 2004/0109107 A1 | 6/2004 | Roes |
| 2004/0141706 A1 | 7/2004 | Escuti et al. |
| 2004/0169813 A1 | 9/2004 | Liang et al. |
| 2004/0257628 A1 | 12/2004 | Mukawa |
| 2005/0001954 A1 | 1/2005 | Stephenson et al. |
| 2005/0052597 A1 | 3/2005 | Kanou et al. |
| 2005/0099575 A1 | 5/2005 | Liang |
| 2005/0122452 A1 | 6/2005 | Yoshida et al. |

FOREIGN PATENT DOCUMENTS

| | | |
|---|---|---|
| EP | 813251 A3 | 7/1994 |
| EP | 649046 A3 | 10/1994 |
| EP | 637772 A1 | 2/1995 |
| EP | 417852 A2 | 4/1995 |
| EP | 833183 A1 | 9/1997 |
| EP | 856768 A3 | 8/1998 |
| EP | 652461 A1 | 4/2000 |
| EP | 0996314 | 4/2000 |
| EP | 746795 B1 | 9/2000 |
| EP | 649046 B1 | 7/2001 |
| EP | 708931 B1 | 8/2001 |
| EP | 735406 A1 | 12/2001 |
| EP | 1452893 A1 | 5/2003 |
| EP | 1007349 B1 | 9/2004 |
| JP | 63-284521 | 11/1988 |
| WO | WO 9101511 A1 | 2/1991 |
| WO | WO 9217814 A1 | 10/1992 |
| WO | WO 9715861 A1 | 10/1995 |
| WO | WO 9531745 A1 | 11/1995 |
| WO | WO 9533224 A1 | 12/1995 |
| WO | WO 9618930 A1 | 6/1996 |
| WO | WO 9619752 A1 | 6/1996 |
| WO | WO 9716765 A1 | 5/1997 |
| WO | WO 9823990 A1 | 6/1998 |
| WO | WO 9823996 A1 | 6/1998 |
| WO | WO 9828658 A1 | 7/1998 |
| WO | WO 9832814 A1 | 7/1998 |
| WO | WO 0007061 A1 | 2/2000 |
| WO | WO 01/07999 A1 | 2/2001 |
| WO | WO 02056097 A2 | 7/2002 |
| WO | WO 2004/013746 A3 | 2/2004 |
| WO | WO 2004/049044 A2 | 6/2004 |
| WO | WO 2004/049051 A1 | 6/2004 |

OTHER PUBLICATIONS

Yamaguchi et al., Multicolor Fluorescent Liquid Crystal Display Using A UV Light Emitting Diode, Molecular Crystals and Liquid Crystals Science and Technology, 1999.

Transmittal of the International Search Report and the Written Opinion of the International Searching Authority dated Mar. 2, 2007.

* cited by examiner

US 7,612,859 B2

ULTRA-VIOLET RADIATION ABSORBING GRID

BACKGROUND

Some displays form images by selectively emitting or reflecting light from adjacent pixels. Stray light from adjacent pixels may sometimes reduce image quality.

BRIEF SUMMARY OF THE INVENTION

Not Applicable

DETAILED DESCRIPTION OF EXAMPLE EMBODIMENTS

Figure 1:
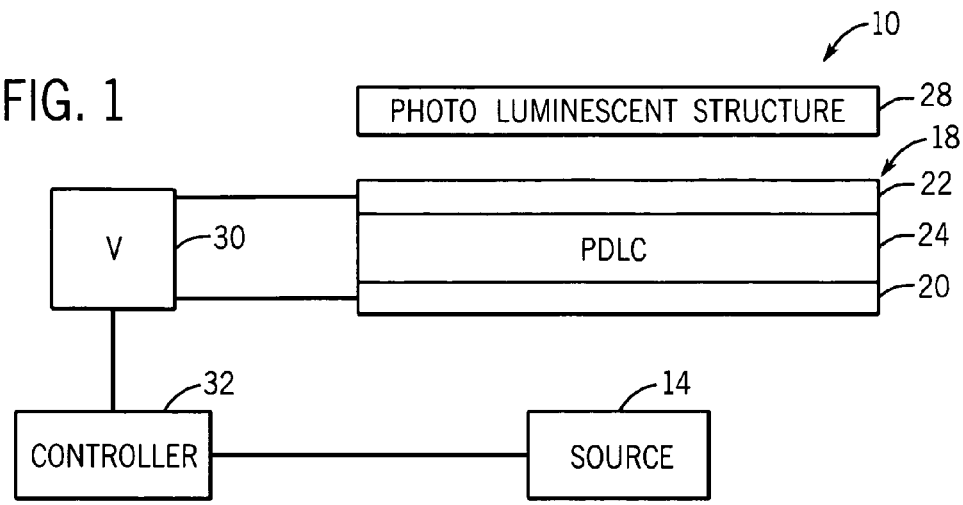
FIG. 1 is a schematic illustration of an embodiment of a display according to one example embodiment.

FIG. 1 schematically illustrates display system 10 which generally includes near-UV light source 14, modulator 18, photo luminescent structure 28, voltage source 30 and controller 32. Near-UV light source 14 comprises a source of near-UV light. For purposes of this disclosure, the term "near-UV light" shall mean a light or electromagnetic energy having wavelengths of between about 360 nanometers and about 420 nanometers. According to one embodiment, source 14 is configured to emit a portion of the electromagnetic spectrum including wavelengths of between about 360 nanometers and about 500 nanometers and nominally between about 370 nanometers and 410 nanometers. In one embodiment, source 14 may comprise light-emitting diodes. In another embodiment, light source 14 may comprise tubes or other sources for near-UV light. According to one embodiment, near-UV light source 14 includes InGaN light emitting diodes configured to emit near-UV light at a wavelength of about 400 nanometers.

Photo luminescent structure 28 comprises one or more layers of one or more photo luminescent materials which are configured to emit a second portion of the electromagnetic spectrum, such as visual light, in response to being impinged by near-UV light from source 14. In one embodiment, photo luminescent structure 28 compromises a color change material such as one or more color phosphors. For example, in one embodiment, photo luminescent structure 28 may be configured to down convert UV light into light having wavelength within a visible spectrum such as red, green and blue. According to one embodiment, photo luminescent structure 28 may be formed from a perylene-based organic color change material which provides saturated color emission, high fluorescence quantum efficiency and acceptable "light-fastness." In one embodiment, photo luminescent structure 28 comprises L-184 supplied by BEAVER LUMINESCERS. In another embodiment, structure 28 may include inorganic phosphors such as europium-doped barium magnesium aluminum oxide (blue emitting phosphor), europium-doped strontium thiogallate (green emitting phosphor), and europium-doped gadolinium oxysulfide (red emitting phosphor) supplied by Phosphor Technology, Inc.

Modulator 18 comprises a mechanism located between source 14 and photo luminescent structure 28 that is configured to selectively attenuate or shutter light from source 14. Modulator 18 actuates between different transmissive states based upon voltage applied by voltage source 30 as controlled by controller 32. Modulator 18 generally includes conductors 20, 22 and polymer dispersed liquid crystal (PDLC) 24. Conductors 20 and 22 comprise one or more layers of transparent electrically conductive material between which is sandwiched PDLC 24. Conductors 20 and 22 are configured to be connected to voltage source 30 so as to create an electrical field across PDLC 24 to actuate PDLC 24 to different light transmissive states. According to one embodiment, conductors 20 and 22 may be formed from a transparent electrically conductive material such as indium tin oxide. In other embodiments, conductors 20 and 22 may be formed from other transparent or translucent electrically conductive materials.

PDLC 24 comprises a layer of polymer dispersed liquid crystal material sandwiched between conductors 20 and 22. PDLC 24 is configured to selectively block or attenuate light based upon the electric field present across PDLC 24. In one embodiment, PDLC 24 is configured to attenuate light or electromagnetic radiation having a wavelength of less than or equal to about 480 nanometers at a higher rate as compared to electromagnetic radiation having wavelengths greater than 500 nanometers. In one embodiment, PDLC 24 is configured to absorb light from light source 14 having wavelengths of less than or equal to about 500 nanometers. In one embodiment, PDLC 24 includes liquid crystal droplets having individual diameters of less than or equal to about 800 nanometers. In other embodiments, PDLC 24 includes liquid crystal droplets having individual diameters of less than or equal to about 500 nanometers. The reduced diameters of the liquid crystal droplets enhances absorption of PDLC 24 of near-UV light. This enhanced absorption may enable PDLC 24 to provide display system 10 with greater contrast.

According to one example embodiment, PDLC 24 is formed by combining a pre-polymer and liquid crystals to form a mixture followed by the addition of a polymerization agent and curing the mixture to form liquid crystal droplets having a diameter of less than or equal to about 800 nanometers. In particular, according to one example embodiment, a liquid crystal and a pre-polymer are mixed in a desired ratio by stirring at room temperature until homogenous.

In one embodiment, the pre-polymer includes a mixture of a photo activator and a monomer. According to one example embodiment, the photo activator may comprise 10.5% by weight MXM035 part A, commercially available from Merck Specialty Chemicals Ltd, South Hampton, England. In such an embodiment, the monomer may comprise 89.5% by weight MXM035 part B, commercially available from Merck Specialty Chemicals Ltd., South Hampton; England. According to one embodiment, this pre-polymer is subsequently mixed with liquid crystal to a point of saturation. In one example embodiment, the liquid crystal may comprise BL035, commercially available from Merck Specialty Chemicals Ltd., South Hampton, England. The pre-polymer and the liquid crystal are mixed such that the liquid crystal has a weight percentage of the resulting pre-polymer/liquid crystal mixture of at least about 55%. In one embodiment, the liquid crystal such as BL035, is mixed with the pre-polymer (MXMO35 parts A and B) to substantially complete saturation at room temperature (20° C.) of about 60% by weight. In some embodiments, the solubility of the liquid crystal in the pre-polymer is increased to above 60% by weight by additional methods such as by heating the pre-polymer to above 20° C. The resulting mixture is stirred until substantially clear.

Upon completion of preparation of the mixture, the mixture is spread to a thickness of between about 2 micrometers and 20 micrometers. In one embodiment, the mixture of the pre-polymer and liquid crystal is dispensed into a suitable cell by capillary action. The cell may be formed from glass coated with a material such as indium tin oxide, wherein the cell gaps are between 2 microns and 20 microns. Alternatively, the liquid crystal/pre-polymer mixture may be coated onto a substrate such as indium tin oxide coated glass or plastic or other techniques such as bar or doctor blade coating.

Once the liquid crystal/pre-polymer mixture has been spread to a thickness of between 2 microns and about 20 microns, the mixture is subsequently cured by exposing the mixture to ultraviolet light. According to one embodiment, curing is performed under conditions of controlled temperature and UV power. In one embodiment, curing is performed in a range of 22 to 30 degrees C with a lamp intensity at a substrate of at least about 1.5 W/cm$^2$ and less than or equal to about 5.5 W/cm$^2$ at a UV wavelength of 315 to 400 nanometers for a time of between about 1 and about 3 seconds. According to one embodiment, a post cure at lower lamp power may be performed to provide for full cure. In one embodiment, the process is complete when the mixture is no longer transitioning from a nematic liquid crystal phase to an isotropic liquid crystal phase. Although the example PDLC 24 has been described as being formed according to the above described process, PDLC 24 may alternatively be formed using other materials, other mixtures or proportions, other curing rates, and in other fashions.

In one embodiment, coating of the liquid crystal/pre-polymer mixture may be upon an open substrate. In such an embodiment, curing of the mixture is performed in an inert atmosphere to inhibit atmospheric oxygen. A second substrate including conductor 20 and conductor 22 may be subsequently laminated to the film resulting from curing of the mixture.

Figure 2:
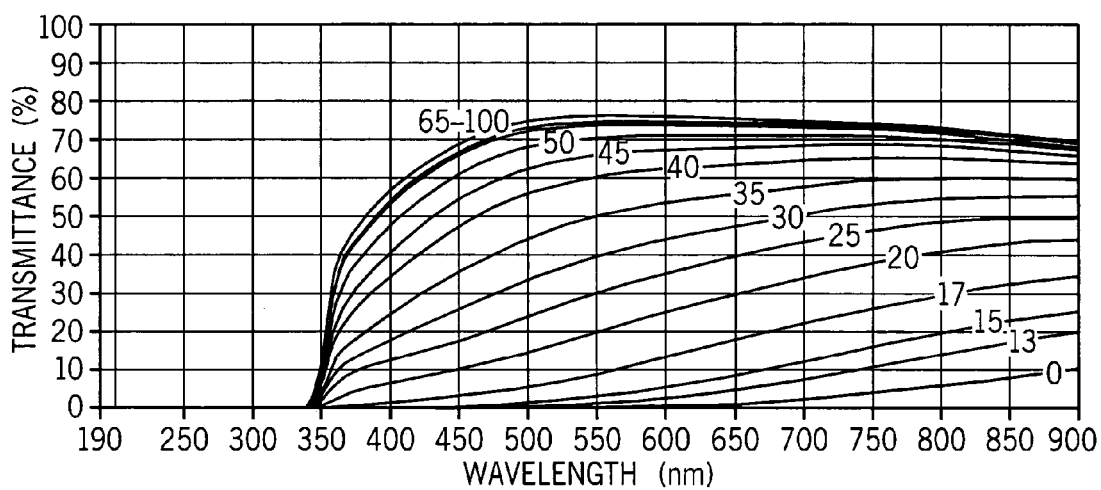
FIG. 2 is a graph illustrating Polymer Dispersed Liquid Crystal (PDLC) transmittance over a range of different wavelengths as a function of applied voltage according to one example embodiment.
Figure 3:
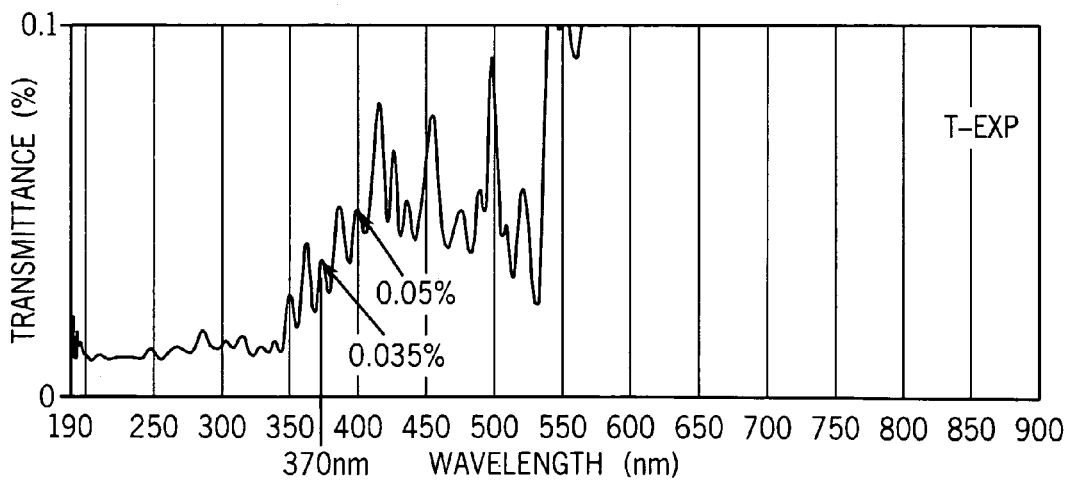
FIG. 3 is a graph illustrating PDLC transmittance of electromagnetic wavelengths at a zero applied voltage according to one example embodiment.

FIGS. 2 and 3 are graphs illustrating spectral transmission response of one embodiment of PDLC 24, as formed according to the above process, at various voltages. In the particular example illustrated, a DC voltage is applied. In other embodiments, a AC voltage may alternatively be used. As shown by the graph in FIG. 2, PDLC 24 strongly attenuates light having a wavelength of about 525 nanometers when a zero voltage is applied. As shown by the graph of FIG. 2, even with an applied voltage of 15 volts, PDLC strongly attenuates light having a wavelength of less than about 450 nanometers. As shown by the graph in FIG. 3, when a zero voltage is applied across PDLC 24, PDLC 24 strongly attenuates light having a wavelength of less than about 400 nanometers. As a result, PDLC 24 may achieve a relatively high percentage transmittance with an applied voltage and a relatively low transmittance in the absence or lessening of the applied voltage. The ratio of the transmittance under a voltage as compared to transmittance without a voltage or with a lessened voltage is sometimes referred to as contrast. As shown by FIG. 3, PDLC 24 will attenuate a 370 nanometer light at an off-state or zero voltage such that about 0.035% of such light passes through PDLC 24. As shown by FIG. 2, PDLC 24 will exhibit a transmittance of 20% when 35 volts are applied across PDLC 24, resulting in a contrast ratio of 570:1. PDLC 24 will exhibit a transmittance of 40% when 65 volts are applied across PDLC 24, resulting in a contrast ratio of 1140:1.

As shown by FIG. 3, for light having a wavelength of 400 nanometers, PDLC 24 exhibits a 0.05% transmittance when in an off-state (i.e., zero volts are applied across PDLC 24). As shown by FIG. 2, having a wavelength of 400 nanometers, PDLC 24 exhibits a transmittance of about 20% upon application of 30 volts, resulting in a contrast ratio of 400:1. Simple contrast ratio is defined as maximum transmission/minimum transmission. As further shown by the graph of FIG. 2, for light having a wavelength of 400 nanometers, PDLC 24 exhibits a transmittance of about 40% in response to 40 volts being applied across PDLC 24, resulting in a contrast ratio of 800:1. As shown by the graphs in FIGS. 2 and 3, the particular example of PDLC 24 facilitates high contrast ratios at relatively low voltages.

As shown by FIG. 1, voltage source 30 is electrically connected to conductors 20 and 22. Voltage source 30 is configured to selectively apply a voltage to one or both of conductors 20 and 22 to selectively vary the transmittance of PDLC 24. Controller 32 comprises a processing unit configured to generate control signals for directing voltage source 30 to selectively apply conductors 20 and 22 to vary the transmittance of PDLC 24. For purposes of disclosure, the term "processing unit" shall mean a presently available or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 32 is not limited to any specific combination of hardware circuitry and software, nor to any particular source for the instructions executed by the processing unit. In the particular example illustrated, controller 32 is further configured to generate control signals directing the operation of light source 14.

In operation, light source 14 emits a portion of the electromagnetic spectrum. In the particular example shown, light source 14 emits light having wavelengths of between about 370 and 400 nanometers. Controller 32 generates control signals directing voltage source 30 to create a voltage across PDLC 24 to actuate PDLC 24 between various levels of transmittance depending upon a desired intensity to be emitted by display system 10. When zero volts is applied across PDLC 24, PDLC 24 substantially attenuates the light from light source 14 prior to such light reaching photo luminescent structure 28. As a result, photo luminescent structure 28 emits little if any light and display system 10 is substantially dark. When controller 32 generates control signals directing voltage source 30 to create a voltage across PDLC 24, PDLC 24 exhibits a higher transmittance such that light from light source 14 passes through PDLC 24 to photo luminescent structure 28. As a result, photo luminescent structure 28 emits a second portion of the electromagnetic spectrum, such as visible light, resulting in display system 10 also emitting visible light. In particular embodiments, photo luminescent structure 28 may be configured to emit selected wavelengths or colors of light upon being impinged by light from light source 14. In particular embodiments, display system 10 may include a multitude of modulator pixels or cells such as modulator 18 and may also include a corresponding multitude of photo luminescent pixels or cells.

Figure 4:
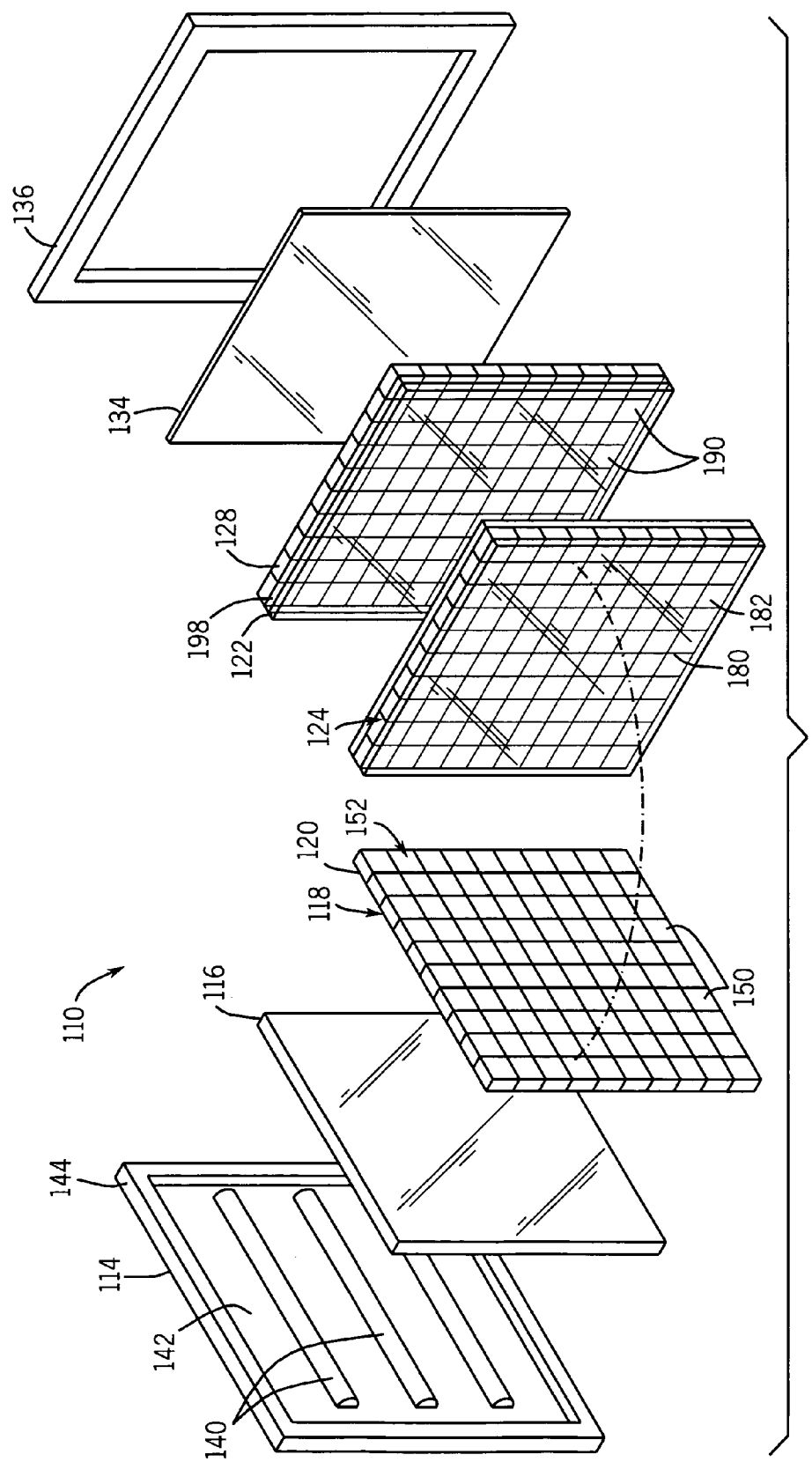
FIG. 4 is an exploded perspective view schematically illustrating another embodiment of the display of FIG. 1 according to an example embodiment.

FIG. 4 is an exploded perspective view of display 110, another embodiment of display system 10 shown and described with respect to FIG. 1. Display 110 generally includes a UV-light source 114, diffuser 116, modulator 118, which includes electrode matrix 120, electrode 122 and PDLC matrix 124, photo luminescent matrix 128, protective film 134, and frame 136. Light source 114 comprises a device configured to emit near-UV light in a direction towards photo luminescent matrix 128. In the particular example illustrated, light source 114 includes ultraviolet light-emitting tubes 140 secured to a support 142 which is bound by a frame 144. In other embodiments, light source 114 may alternatively include tubes configured to emit light having wavelengths proximate to the ultraviolet wavelengths. In still other embodiments, light source 114 may alternatively include light emitting diodes configured to emit near-UV light.

Diffuser 116 comprises a sheet or layer of translucent material configured to diffuse light emitted by light source 114 to distribute the light across the display. In particular embodiments, a second panel (not shown) (from NITTO DENKO Group, OPTMATE Corp as an example) may be provided which collimates the light so that it enters normal to the surface plane of the display. In the particular embodiment shown, diffuser 116 comprises a translucent plastic such as Illuminex diffuser film commercially available from GE Advanced Materials. In other embodiments, diffuser 116 may comprise other materials or may be omitted.

Figure 5:
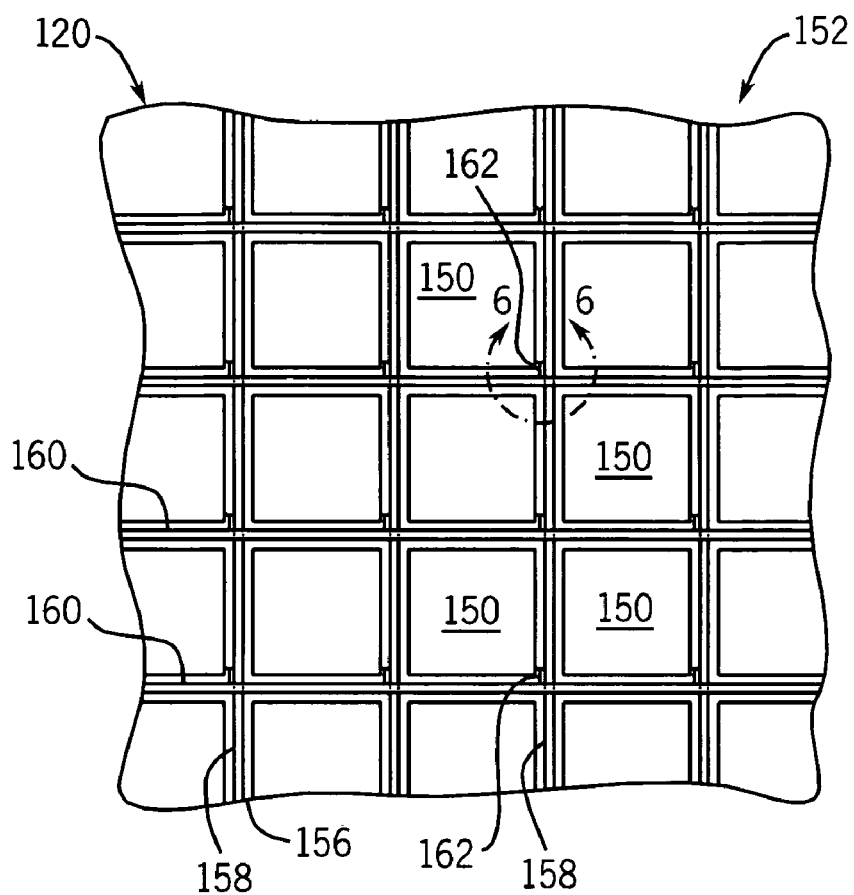
FIG. 5 is an enlarged fragmentary plan view of an electrode matrix of the display of FIG. 4 according to an example embodiment.
Figure 6:
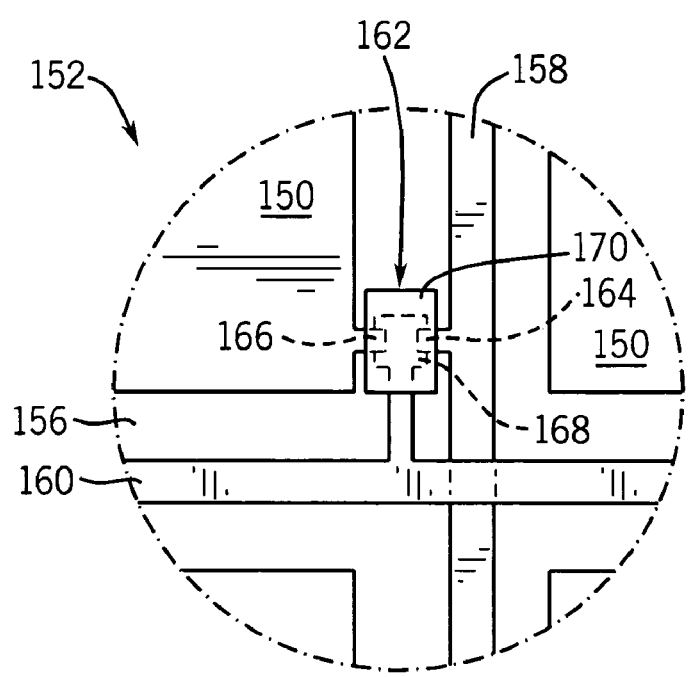
FIG. 6 is an enlarged view of the electrode matrix of FIG. 5 taken along line 6-6 according to an example embodiment.
Figure 7:
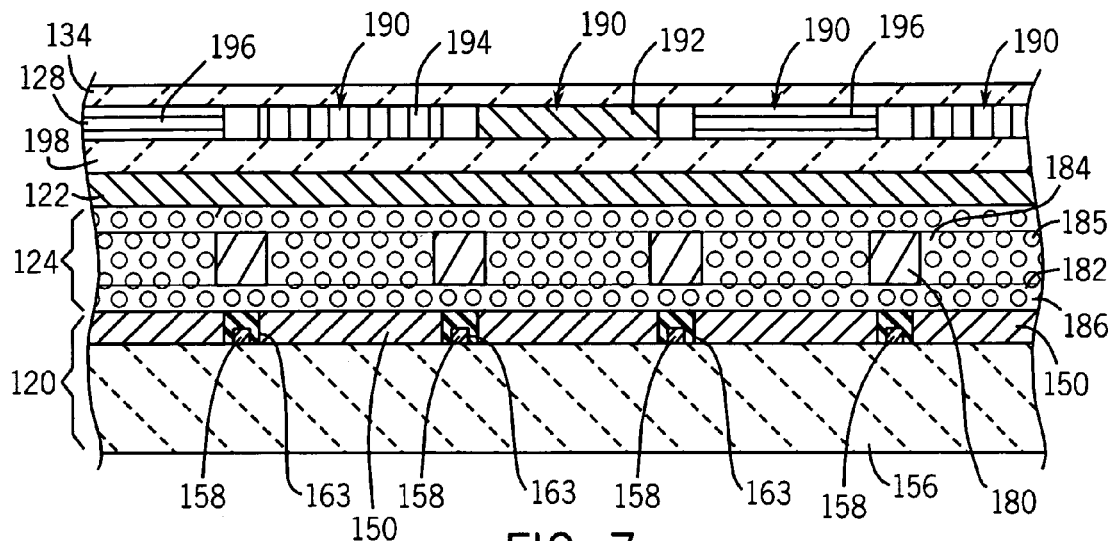
FIG. 7 is a fragmentary sectional view of an assembled portion of the display of FIG. 4 according to an example embodiment.

Electrode matrix 120 comprises an assembly including a plurality of independently or selectively chargeable electrodes 150 (schematically shown in FIG. 4). Electrodes 150 are configured to be independently charged to distinct voltages and cooperate with electrode 122 to selectively actuate distinct portions of PDLC matrix 124 between different transmissive states. FIGS. 5 and 6 illustrate face 152 of electrode matrix 120 in greater detail. FIG. 7 is a sectional view illustrating matrix 120 in greater detail, as well illustrating electrode 122, matrix 124, matrix 128 and film 134 as assembled. As shown by FIGS. 5-7, in addition to electrodes 150, electrode matrix 120 includes substrate 156, data lines 158, signal lines 160 and switching devices 162. Electrodes 150 comprise platelets or panels of transparent electrically conductive material, such as indium tin oxide, arranged across face 152. Electrodes 150 are electrically separated or partitioned from one another by dielectric breaks 163 (shown in FIG. 7). In the particular example illustrated, breaks 163 comprise portions of dielectric material, such as silicon, extending around and between electrodes 150. Breaks 163 are omitted in FIGS. 5 and 6 for purposes of illustrating lines 158 and 160. In other embodiments, breaks 163 may comprise gaps between electrodes 150. Although in the particular embodiment illustrated, electrodes 150 are illustrated as having a square geometry and as being arranged in a series of linearly arranged rows and columns, electrodes 150 may alternatively have other shapes or other surface geometries and may be arranged in other orders or relative positions along face 152. In other embodiments, electrodes 150 may be formed from other transparent electrically conductive materials.

Substrate 156 comprises one or more layers of transparent dielectric material configured to support electrodes 150, data lines 158, signals lines and switching devices 162. In one embodiment, substrate 156 may comprise glass. In another embodiment, substrate 156 may comprise one or more layers of a polymeric or plastic material.

Data lines 158 comprise electrically conductive lines or traces of one or more electrically conductive materials carried or formed upon substrate 156. In other embodiments, lines 158 may be formed within the material or materials of breaks 163. Data lines 158 are electrically connected to a voltage source, such as voltage source 30 shown and described with respect to FIG. 1, and are selectively connectable to each of electrodes 150 by switching devices 162. Data lines 158 supply charge to electrodes 150 to establish a voltage across PDLC matrix 124 as will be described hereafter.

Signal lines 160 comprise electrically conductive lines or traces carried or formed upon substrate 156. In other embodiments, lines 160 may be formed within the material or materials of breaks 163. Signal lines 160 are configured to be selectively connected to a voltage source, such as voltage source 30 shown and described with respect to FIG. 1, by a controller, such as controller 32. Signal lines 160 are further electrically connected to switching device 162. Signal lines 160 are configured to apply a charge to switching device 162 so as to actuate switching device 162 between a first electrically conductive state in which charge from data line 158 is transmitted to electrode 150 and a second open state in which charge from data line 158 is not transmitted to electrode 150.

Switching devices 162 comprise devices configured to selectively transmit charge from data lines 158 to electrodes 150 based upon signal voltages received via signal lines 160. In the particular example illustrated in FIG. 6, switching devices 162 each comprise a thin film transistor arrangement including a source electrode 164 electrically connected to data line 158, a drain electrode 166 electrically connected to electrode 150, a gate electrode 168 (shown in hidden lines) electrically connected to signal line 160 and a semiconductive material 170 interposed between source electrode 164, drain electrode 166 and gate electrode 168. In other embodiments, switching device 162 may comprise a metal-insulator-metal device or other switching devices. In still other embodiments, in lieu of including an active matrix control arrangement, electrode matrix 120 may alternatively include a passive control arrangement for each of electrodes 150, wherein switching devices for actuating electrodes 150 between different voltage levels are grouped together along a perimeter or at another location outside of electrode matrix 120.

Electrode 122 generally comprises one or more continuous layers or sheets of transparent electrically conductive material extending opposite to electrode matrix 120 with PDLC matrix 124 therebetween. Electrode 122 cooperates with electrodes 150 of electrode matrix 120 to create a voltage across PDLC matrix 124 to actuate portions of PDLC matrix 124 between different transmissive states. In one particular embodiment, electrode 122 is electrically connected to ground. In other embodiments, electrode 122 may be charged. In one embodiment, electrode 122 is formed from an electrically conductive material such as indium tin oxide. In other embodiments, electrode 122 may be formed from other transparent electrically conductive materials.

Figure 8:
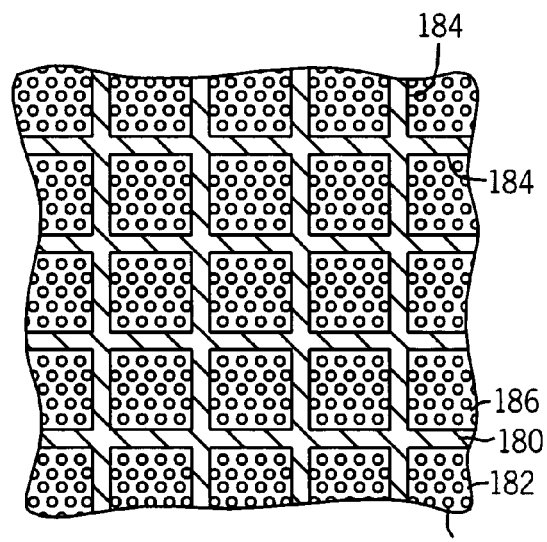
FIG. 8 is an enlarged fragmentary plan view of a PDLC matrix of the display of FIG. 4 according to an example embodiment.

PDLC matrix 124 is sandwiched between electrode matrix 120 and electrode 122. As shown by FIGS. 7 and 8, PDLC matrix 124 generally includes grid 180 and PDLC 182. Grid 180 comprises a series of dielectric near-UV light absorbing walls which substantially partition PDLC 182 into a plurality of cells or pixels 184. As shown by FIG. 7, such cells or pixels 184 are generally aligned with corresponding electrodes 150 of electrode matrix 120. In particular, the walls of grid 180 are aligned with and extend opposite to the dielectric breaks 163 separating electrodes 150. The walls of grid 180 attenuate the transmission of near-UV light passing through PDLC 182 in one cell 184, that has been actuated to a transmissive state, into an adjacent cell 184 containing PDLC 182 which is intended to be in a lesser transmissive state. In other words, grid 180 reduces visual cross talk between portions of PDLC 182 that are in different transmissive states due to different applied voltages by their respective electrodes 150. In the particular example shown in which grid 180 also extends opposite to dielectric breaks 163 between electrodes 150, grid 180 also serves to hide or block data lines 158, signal lines 160 and switching devices 162 (shown in FIG. 6). Although grid 180 is illustrated as forming rectangular or square cells 184, wherein each cell has substantially the same dimensions, grid 180 may alternatively be configured to form cells 184 having other shapes and cells 184 having different uniform or non-uniform dimensions.

In the particular example illustrated, grid 180 comprises a screen-like panel formed from a flexible dielectric material such as black anodized aluminum. In other embodiments, grid 180 may alternatively be formed from other dielectric light absorbing materials such as black polymers. In the particular example illustrated, grid 180 has a substantially uniform depth across its length and width. The depth is at least 2 microns, less than or equal to about 20 microns and nominally about 8 microns. In other embodiments, grid 180 may have other dimensions. In some embodiments, grid 180 may be omitted.

PDLC 182 comprises a polymer dispersed liquid crystal material having liquid crystal droplets 185 to disperse throughout a polymer 186. Such liquid crystal droplets have a diameter of less than or equal to about 800 nanometers and nominally less than or equal to about 500 nanometers. In one embodiment, PDLC 182 may be formed according to the above-described procedure as set forth with respect to PDLC 24.

According to one embodiment, grid 180 is formed within PDLC 182 prior to the curing of the pre-polymer/liquid crystal mixture. In one embodiment, grid 180 is immersed within a layer of liquid pre-polymer/liquid crystal mixture. The mixture encapsulating grid 180 is subsequently cured at a rate such that the liquid crystal forms droplets having individual diameters less than or equal to about 800 nanometers and nominally less than or equal to about 500 nanometers. This process enables cells 184 or grid 180 to be quickly filled with the mixture that forms PDLC 182 upon being cured. This process may result in PDLC 182 continuously extending from one cell 184 to an adjacent cell 184 across grid 180. In other embodiments, the pre-polymer/liquid crystal mixture may be applied across grid 180. In still other embodiments, cells 184 may be individually or collectively filled with the pre-polymer/liquid crystal mixture prior to curing without the mixture flowing over or extending above the walls of grid 180. In still other embodiments, PDLC 182 may be deposited within cells 184 after the initial pre-polymer/liquid crystal mixture is cured.

As shown by FIG. 4, photo luminescent matrix 128 includes a plurality of pixels 190 (schematically shown in FIG. 4) of photo luminescent material across and opposite to cells 184 containing a PDLC 182. In other embodiments, pixels 190 may be formed from a photo luminescent material such as a perylene-based organic color change material. In other embodiments, pixels 190 may be formed from other photo luminescent materials, color change materials or wavelength downconverters.

Figure 9:
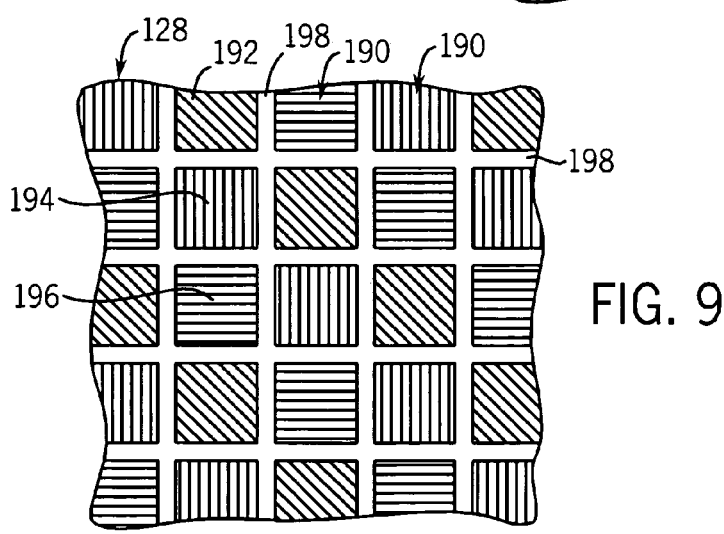
FIG. 9 is an enlarged fragmentary plan view of a photo luminescent matrix of the display of FIG. 4 according to an example embodiment.

As shown by FIGS. 7 and 9, in the example illustrated, pixels 190 are configured to emit different portions of the electromagnetic spectrum such as different wavelengths of light or different colors as compared to one another upon being impinged or irradiated by near-UV light that has been transmitted through PDLC matrix 124. In the particular example shown, pixels 190 include pixels 192 of photo luminescent material configured to emit red light upon being irradiated by near-UV light, pixels 194 are configured to emit green light upon being irradiated by near-UV light and pixels 196 are configured to emit blue light upon being irradiated by near-UV light. As shown by FIG. 9, pixels 192, 194 and 196 are arranged in an off-set pattern relative to one another such that a first pixel configured to emit a particular color is not located side-by-side another pixel configured to emit the same color. This pattern facilitates selective activation of pixels 192, 194 and 196 to provide a multi-colored display. In other embodiments, pixels 192, 194 and 196 may have other patterns or may be configured to emit other colors of light.

As shown by FIG. 7, pixels 190 are formed by patterning photo luminescent materials upon a transparent dielectric substrate 198. In the particular example illustrated, substrate 198 may comprise a panel or sheet of glass. In another embodiment, substrate 198 may comprise a panel or sheet of other transparent dielectric material such as a transparent polymer material. As shown by FIG. 4, in one embodiment, substrate 198 may also serve as a substrate upon which electrode 122 is formed. According to one embodiment, substrate 198 has a thickness of about 2 mm to space pixels 190 from cells 184 and PDLC 182. In other embodiments, substrate 198 and electrode 122 may have other thicknesses to space pixels 190 from PDLC 182. In still other embodiments, substrate 198 may be omitted, wherein pixels 190 are patterned directly upon electrode 122 or wherein pixels 190 are patterned upon another structure such as film 134 (shown in FIG. 4).

As shown by FIG. 7, each of pixels 190 extends opposite to and generally corresponds to an individual cell 184 containing PDLC 182, wherein the cells 184 of PDLC 182 extend opposite and correspond to individual electrodes 150. In the particular embodiment illustrated, each of pixels 190 has a surface area of at least 2 um×6 um, of less than or equal to 1 mm×3 mm and nominally about 100 um×300 um. In the particular embodiment illustrated, each of pixels 190 as a shape and dimension corresponding to shapes and dimensions of cells 184 of grid 180 and electrodes 150. In other embodiments, pixels 190 may have shapes or dimensions differing from that of cells 184 or electrodes 150. Although pixels 190 are illustrated as having a square geometry and as being arranged in rows and columns, pixels 190 may alternatively have other surface geometries and may have other arrangements.

In operation, a controller such as controller 32 (shown and described with respect to FIG. 1) generates control signals directing a voltage source, such as voltage source 30 (shown and described with respect to FIG. 1) to transmit a voltage along data lines 158 (shown in FIG. 6) and to selectively transmit voltage along signal lines 160 (shown in FIG. 6) to selectively actuate switching devices 162 (shown in FIG. 6) between open and closed states to selectively charge individual electrodes 150. Those electrodes 150 which are charged establish a voltage or electric field across their respective cells 184 containing PDLC 182. As a result, the PDLC 182 in such cells 184 exhibits increased transmittance such that near-UV light emitted by light source 114 passes through such cells 184 and impinges upon corresponding opposite pixels 190. At the same time, those electrodes 150 which are not charged as a result of switching devices 162 remaining in an open state do not apply an electric field across PDLC 182 of their respective opposite cells 184 or create a lesser electric field such that the PDLC 182 within such cells 184 has a lower transmittance. As a result, the PDLC 182 in which a lesser electric field is applied, attenuates near-UV light from light source 114 to a greater extent. Consequently, pixels 190 aligned and generally opposite to those cells 184 containing light attenuating PDLC 182 are irradiated with less near-UV light and emit a lower intensity of light or no light. By selectively charging electrodes 150, the controller, such as controller 32, shown in FIG. 1, may selectively cause pixels 192, 194 and 196 to be irradiated by different levels of near-UV light such that such pixels 192, 194 and 196 emit different intensities of red, green and blue light, respectively, to produce a desired color image or display.

Film 134 comprises one or more layers of translucent material configured to overlie and protect photo luminescent pixels 190 of photo luminescent matrix 128. In particular embodiments, film 134 may additionally include other optical materials configured to enhance light emitted by display 110. Frame 136 comprises a structure configured to cooperate with frame 144 so as to rigidify and secure intermediate components of display 110 and to potentially facilitate mounting of display 110 to other structures. In particular embodiments, film 134 and frame 136 may be omitted or may have other configurations.

Overall, display 110 provides a display image that exhibits relatively high levels of brightness and high levels of contrast. Display 110 provides an emissive type display and operates at relative low voltages and with relatively fast response times. At the same time, display system 10 may be configured so as to be flexible, facilitating display system 10 for use in touch screen applications.

Figure 10:
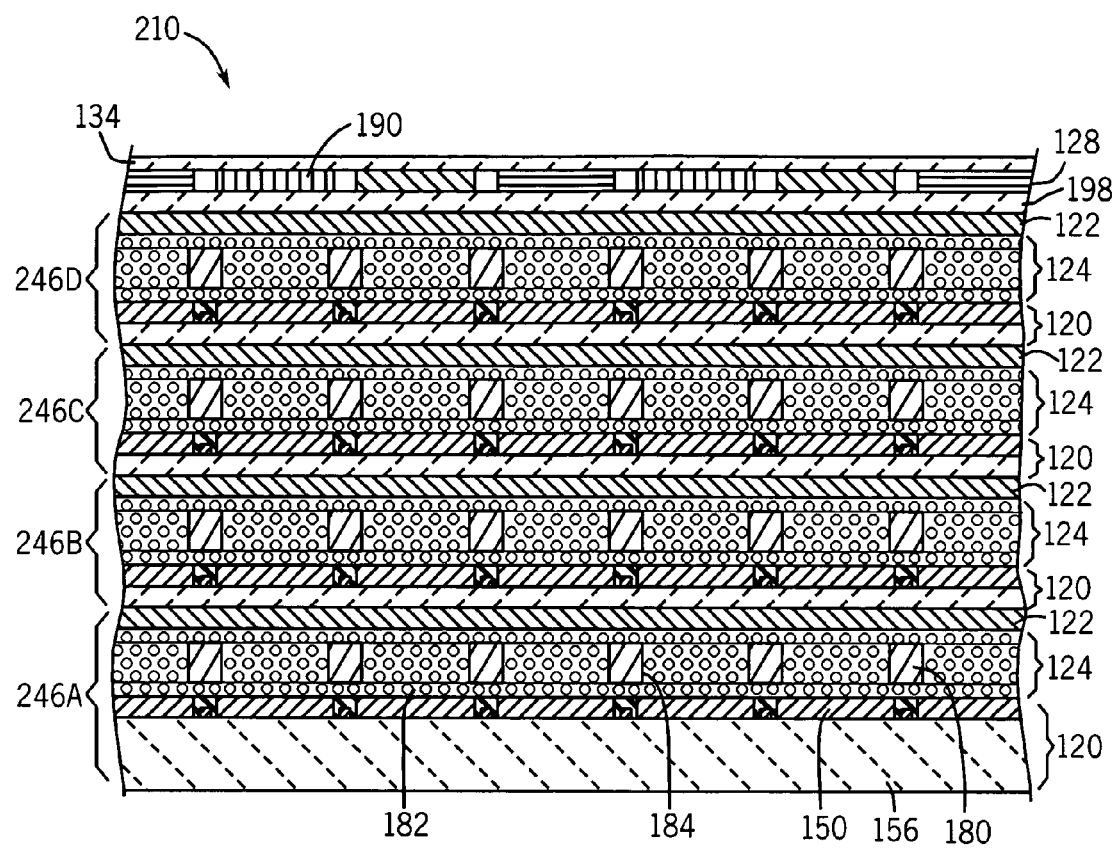
FIG. 10 is a fragmentary sectional view of a portion of another embodiment of the display of FIG. 1 according to an example embodiment.

FIG. 10 is a sectional view schematically illustrating display system 210, another embodiment of display system 10. Display system 210 is similar to display system 110 (shown and described with respect to FIGS. 4-9) except that display system 210 includes a stack of shutters or modulators 246A, 246B, 246C and 246D (collectively referred to as modulators 246) in lieu of a single modulator 146 as shown in FIG. 7. Those remaining components of display system 210 correspond to the components of display system 110. For example, display system 210 also includes substrate 198, photo luminescent matrix 128 and film 134 (shown and described with respect to display system 110). Although not illustrated in FIG. 10, display system 210 additionally includes light source 114, diffuser 116 and frame 136 (shown and described with respect to FIG. 4). Modulators 246 are each configured to selectively attenuate near-UV light emitted by light source 114 (shown in FIG. 4) prior to such near-UV irradiating pixels 190 of photo luminescent matrix 128. Modulators 246 are each substantially similar to modulator 146 (shown and described in FIG. 7 with respect to display 110). In particular, each modulator 246 includes electrode matrix 120, electrode 122 and PDLC matrix 124. As noted with respect to display 110, in some embodiments, PDLC matrix 124 may omit grid 180.

Modulators 246 cooperate with one another to selectively attenuate light and to selectively permit transmission of near-UV light from light source 114 (shown in FIG. 4) to pixels 190 of photo luminescent matrix 128. Because modulators 246 are stacked, the individual thicknesses of PDLC matrix 124 of each of modulators 246 may be reduced while maintaining the total or collective thickness of PDLC 182 between light source 114 (shown in FIG. 4) and photo luminescent matrix 128. By reducing the thickness of each individual PDLC matrix 124, electrodes 150 may be more closely spaced to electrodes 122 of each modulator 246. This reduced spacing between electrodes 150 and 122 of each modulator 246 may reduce the operating voltages used to actuate PDLC 182 between different transmittance states while substantially maintaining or reducing by a relatively small amount the responsiveness of cells 184 containing PDLC 182 to actuate between different transmittance states. By maintaining the overall or collective thickness of PDLC 182, the collectively ability of modulators 246 to attenuate near-UV light prior to such light irradiating photo luminescent matrix 128 is also maintained or reduced by a relatively small amount as compared to a single photo luminescent matrix 124 having the same thickness. As a result, the contrast of display 210 is substantially maintained.

According to one example embodiment, each PDLC matrix 124 of modulators 246 (A-D) has a thickness of less than or equal to about 2 microns. In other embodiments, each PDLC matrix 124 may have greater thicknesses or reduced thicknesses. Although display 210 is illustrated as including four stacked modulators 246, display system 10 may alternatively include a greater or fewer number of such stacked modulators.

According to one embodiment, aligned electrodes 150 of modulators 246 are electrically connected to a voltage source so as to be substantially charged to the same voltage such that PDLC 182 in aligned cells 184 of modulators 246 all exhibit the same transmittance as one another. In other embodiments, electrodes 150 of modulators 246 that are aligned with one another may alternatively be electrically connected to a voltage source and a controller, such as controller to alternatively independently charge electrodes 150 to distinct voltages as compared to one another. By varying the charge applied to different aligned electrodes 150, the controller of display 210 may adjust and control the extent to which near-UV light is attenuated by the aligned set of electrodes 150 so as to also adjust and control the extent to which the aligned pixel 190 is irradiated by the near-UV light and the intensity of the light emitted by the particular pixel 190.

Figure 11:
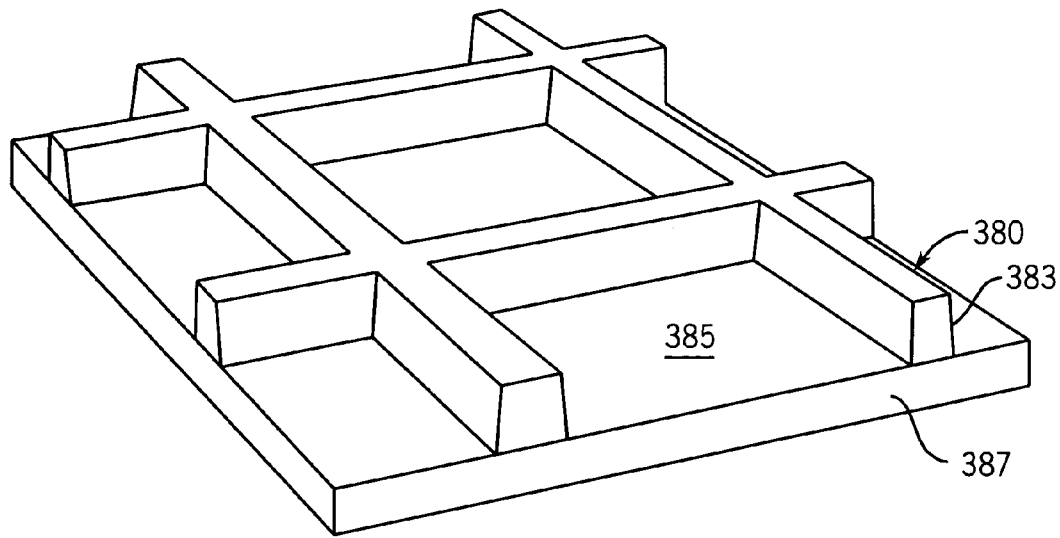
FIG. 11 is a top perspective view of one embodiment of an ultra-violet radiation absorbing grid according to one example embodiment.

FIG. 11 illustrates grid 380, another embodiment of grid 180 shown and described with respect to FIGS. 4, 7, 8 and 10. Like grid 180, grid 380 constitutes a series of dielectric near-UV light absorbing walls 383 which form a 2-dimensional array of cavities, depressions or wells 385 configured to receive and contain PDLC 182 (shown and described with respect to FIG. 7) and to partition PDLC 182 into a plurality of pixels 184 (shown and described with respect to FIG. 7). Walls 383 absorb or otherwise attenuate transmission of near-UV light between adjacent wells 385.

In the particular embodiment illustrated, walls 383 are formed from a negative resist polymer. In one embodiment, walls 383 are formed from a dyed negative resist polymer. For example, in one embodiment, walls 383 may be formed from a dyed negative resist polymer that includes an epoxidized bisphenol-A/formaldehyde novolac copolymer combined with a photo acid generator (sometimes referred to as SU8). In still other embodiments, other near-UV light absorbing polymers also may be utilized to form walls 383.

In one embodiment, walls 383 have a generally uniform height such that grid 380 has a uniform depth across its length and width. According to one embodiment, the depth of grid 380 is at least 2 microns to contain a sufficient amount of PDLC 182. In one embodiment, walls 383 have a height of 4 microns to enhance UV absorption or attenuation. In one embodiment, walls 383 have a height or depth of at least about 10 microns to even further enhance UV absorption and attenuation. Although walls 383 are illustrated as being configured such that wells 385 are square in shape, in other embodiments, walls 383 may alternatively be configured such that wells 385 have other geometric shapes.

According to one embodiment, grid 380 is made by forming a layer of a dyed negative resist polymer, such as SU8, upon a substrate such as substrate 387 shown in FIG. 11. Substrate 387 supports the dyed negative resist polymer. In one embodiment, substrate 387 may constitute glass. In other embodiments, substrate 387 may be an electrode such as electrode 122 or 150 shown in FIG. 14. In still other embodiments, substrate 387 may constitute one or more various other transparent materials.

Figure 12A:
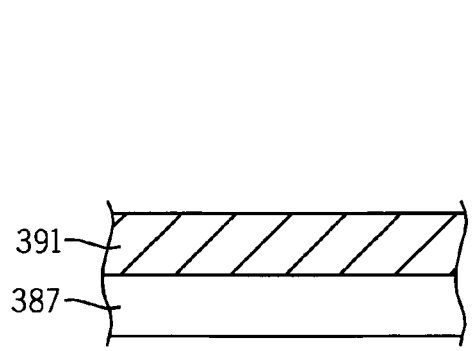
FIGS. 12A-12C illustrate one example of a method for forming the grid of FIG. 11 according to one example embodiment.
Figure 12B:
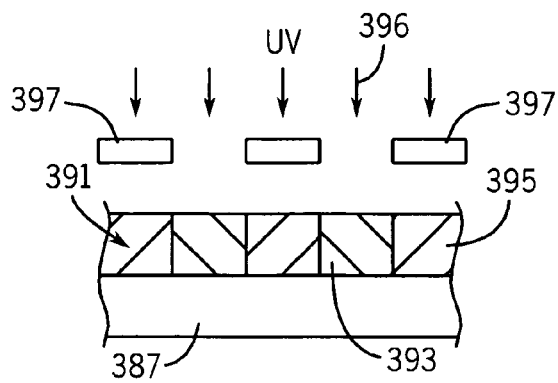
Figure 12C:
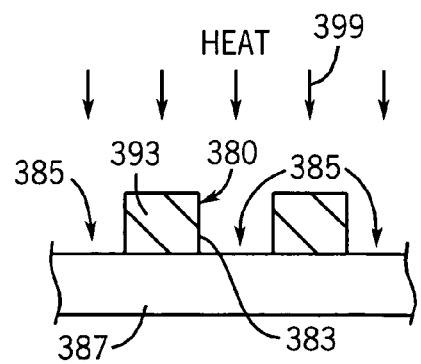

FIGS. 12A-12C schematically illustrate one method for forming grid 380. As shown by FIG. 12A, a layer 391 including a dyed negative resist polymer is formed or otherwise provided upon substrate 387. In one embodiment, layer 391 may be spin coated upon substrate 387. In other embodiments, layer 391 may be formed or otherwise provided upon substrate 387 by other methods.

As shown by FIG. 12B, once layer 391 is formed upon substrate 387, portions 393 of the layer corresponding to walls 383 are selectively exposed to ultra-violet light or radiation 396 using a UV light blocking or attenuating mask 397. Cross-linking catalysts, such as photo acids are generated in the exposed portions 393 of the layer of negative resist photo polymer. Thereafter, the unexposed portions of the layer of negative resist photo polymer are removed. According to one embodiment, layer 391 is subjected to a post-exposure bake or heating at a temperature and for a duration sufficient such that the materials of portions 393 begin cross-linking as a result of the cross-linking catalysts while unexposed portions 395 experienced little if any cross-linking. Such post-exposure heating is at a temperature and for a duration such that although the materials of portions 393 may not be completely cross-linked, portions 393 are sufficiently viscous, solid or stable to permit unexposed portions 395 to be washed away while leaving portions 393 upon substrate 387 as shown in FIG. 12C.

As shown by FIG. 12C, exposed portions 383 are subsequently hard baked or heated at a temperature and for a duration such that the dyed negative resist polymer of portions 393 experiences a greater degree of cross-linking. In one embodiment, the dyed negative resist polymer is heated at a temperature and for a duration such that the material is fully cross-linked. The resulting grid 380 and its underlying substrate 387 may then be incorporated into a display system such as display system 110 or 210 described above or other display systems.

Figure 13:
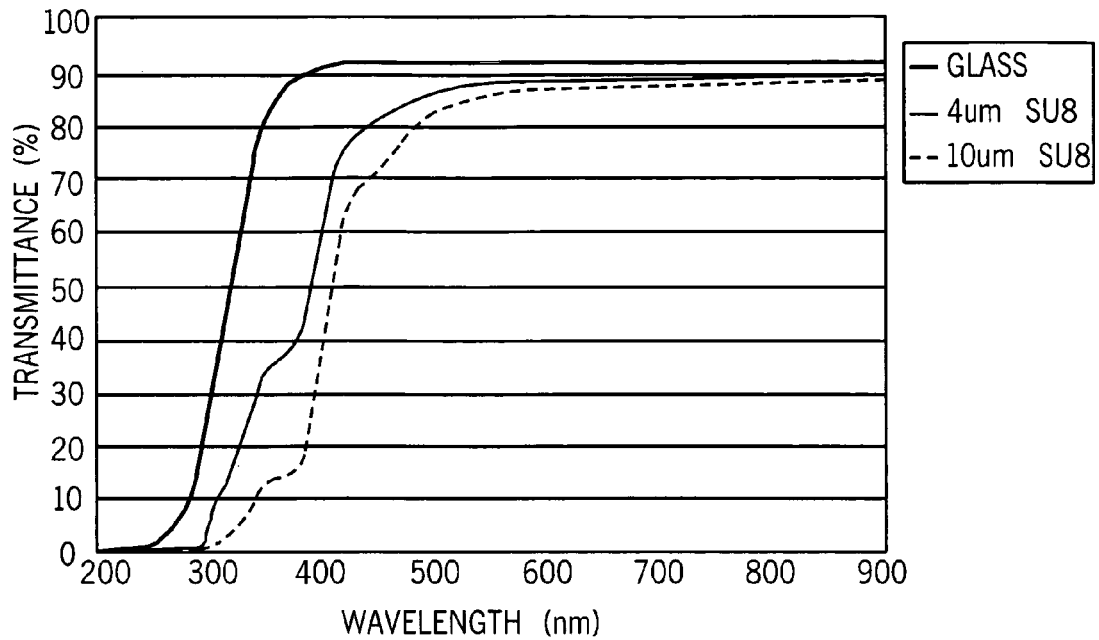
FIG. 13 is a graph illustrating radiation transmittance of example grids as compared to glass according to one example embodiment.

FIG. 13 graphically illustrates transmittance of example embodiments of grid 380 having different thicknesses formed upon a glass substrate 387. As shown by FIG. 13, glass substrate 387, alone, transmits about 85 percent of ultra-violet radiation or light having a nominal wavelength of 360 nanometers. As shown by FIG. 13, a grid 380 is formed from dyed SU8 upon a glass substrate 387 and having a thickness or depth of about 4 microns transmits less than 40% and nominally about 36 percent of UV light or radiation having a nominal wavelength of about 360 nanometers. As shown by FIG. 13, a grid 380 formed from dyed SU8 upon glass substrate 387 and having a thickness of about 10 microns transmits less than 15 percent and nominally about 13.5 percent of UV light or radiation having a nominal wavelength of about 360 nanometers. As shown by FIG. 13, grid 380 formed from dyed SU8 is well suited for absorbing or attenuating UV light, facilitating its employment in display systems 110 and 210 described above or in other similar display systems.

Figure 14:
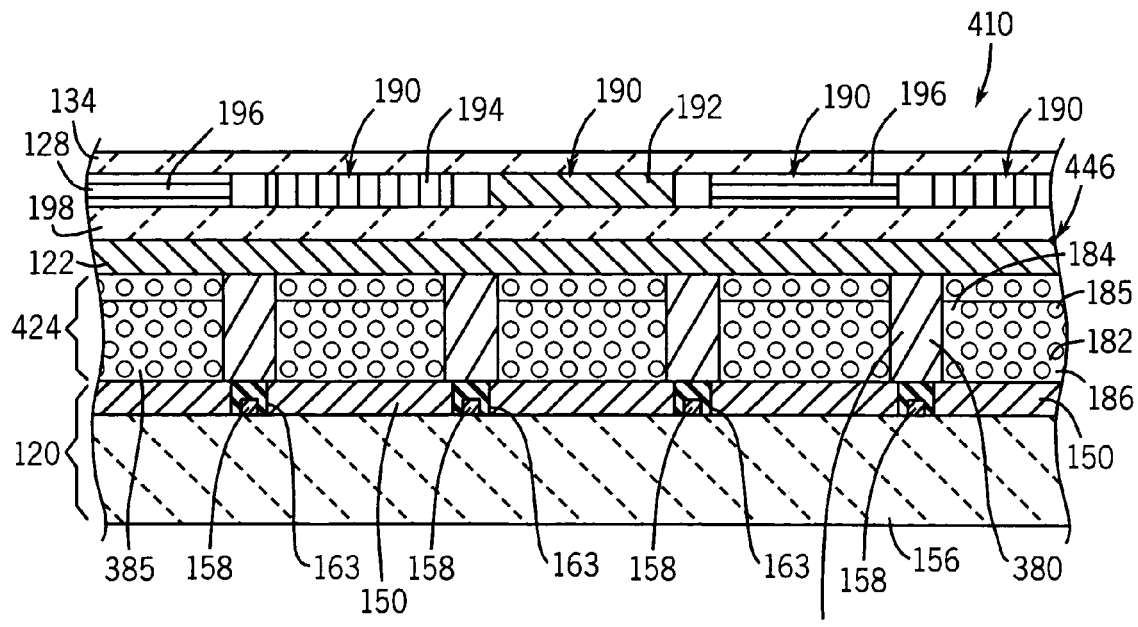
FIG. 14 is a fragmentary sectional view of another embodiment of the display system of FIGS. 4-9 including the grid of FIG. 11 according to one example embodiment.

FIG. 14 is a sectional view schematically illustrating display system 410, another embodiment of display system 110, shown and described with respect to FIGS. 4 and 7. Display system 410 is similar to display system 110 except that display system 410 includes grid 380 in lieu of grid 180. Those remaining elements of system 410 which correspond to elements of system 110 are numbered similarly. Although not shown in FIG. 14, display system 610 additionally includes UV light source 114, diffuser 116 and frame 136 shown in FIG. 4.

As shown by FIG. 14, grid 380 is positioned directly adjacent to electrodes 150 with walls 383 overlying and contacting the material breaks 163. In one embodiment, grid 380 is formed from a dyed negative resist polymer, such as SU8, formed upon electrode matrix 120, wherein electrodes 150 and breaks 163 serve as a substrate for the dyed negative resist polymer prior to selectively exposing the dyed negative resist polymer to ultra-violet radiation, the removal of portions of the layer of dyed negative resist polymer and heating of the remaining ultra-violet exposed portions of the layer as described above with respect to FIGS. 12B and 12C. As a result, PDLC 182 which is subsequently positioned within wells 385 of grid 380 is in direct contact with electrodes 150 while forming pixels 184 which are in alignment with electrode 150 and corresponding pixels 190. In operation, walls 383 of grid 380 absorb near-UV light from one or more sources 140 (shown in FIG. 4) to attenuate transmission of UV light across walls 383 from one well 385 to an adjacent well 385 containing PDLC 182.

Although grid 380 is illustrated in FIG. 14 as being employed as part of a display system 410 and as part of a single near-UV light modulator 446 including electrode matrix 120, PDLC matrix 424 and electrode 122, in other embodiments, grid 380 may alternatively be utilized in other display systems having a stack of shutters or modulators 446 in lieu of a single modulator 446. For example, grid 380 may be employed in multiple stacked modulators 446 such as display system 210 shown in FIG. 10. In other embodiments, grid 380 may alternatively be formed upon another substrate other than electrode matrix 120, wherein the substrate is removed prior to incorporation of grid 380 between electrode matrix 120 and electrode 122 or wherein the substrate is configured so as to minimally interfere with the application of an electric field across PDLC 182 within wells 385 by electrodes 150 and 122. For example, in one embodiment, grid 380 may be formed upon a glass substrate, wherein the glass substrate is positioned against electrodes 150 and breaks 163 and wherein the glass substrate has a thickness so as to minimally interfere with application of electric field across PDLC within wells 385.

Figure 15:
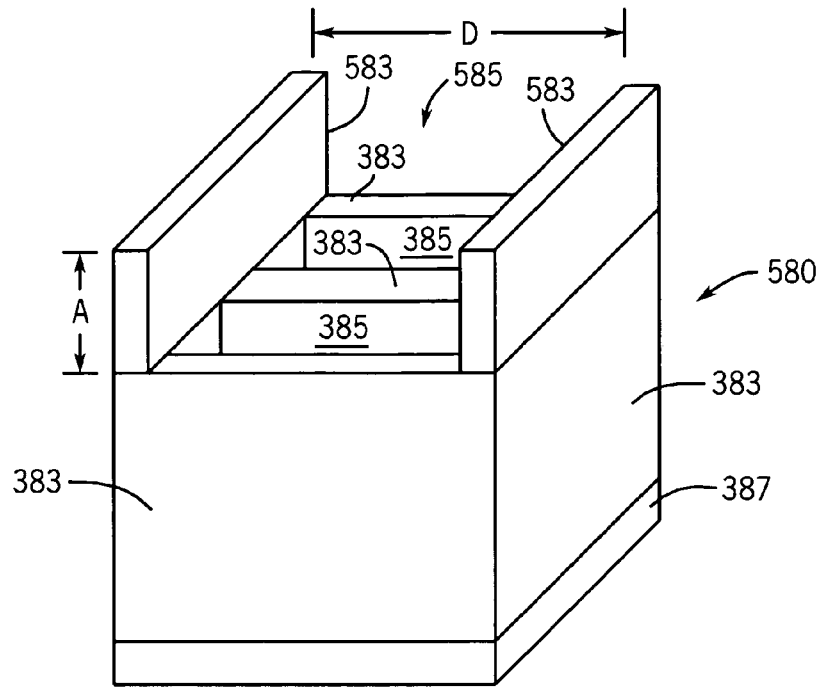
FIG. 15 is a fragmentary top perspective view of another embodiment of the grid of FIG. 11 according to an example embodiment.

FIG. 15 schematically illustrates a portion of grid 580, another embodiment of grid 380 shown and described with respect to FIG. 11. For ease of illustration, those elements of grid 580 that correspond to elements of grid 380 are numbered similarly. Grid 580 is similar to grid 380 except that grid 580 additionally includes walls 583 projecting from walls 383 on opposite sides of wells 385 to form troughs 585. Troughs 585 constitute elongate channels extending above wells 385. Troughs 585 facilitate wicking of PDLC 182 (shown and described with respect to FIG. 7) into wells 385 to reduce undesirable formation of bubbles in PDLC 182 as wells 385 are being filled. In addition, walls 583 may assist in providing more accurate control of a thickness or height of grid. 580 which may result in more accurate control of the spacing between electrodes that may be placed on opposite sides of grid 580 such as electrodes 122 and 150 shown in FIGS. 14 and 16.

In one embodiment, walls 583 are spaced from one another by a distance D of at least about 2 micrometers, less than or equal to about 1 millimeter and nominally about 100 micrometers. In one embodiment, each wall 583 has a height H of at least about 2 micrometers, less than or equal to about 20 micrometers and nominally about 10 micrometers. Such configuration facilitates efficient wicking of PDLC 182 (shown in FIG. 7). In other embodiments, walls 583 may have other dimensions and configurations.

According to one embodiment, walls 583 are formed from the same material as that of walls 383 of grid 380. In one embodiment, walls 583 are formed from a dyed negative resist polymer such as SU8. As a result, walls 583 further assist in attenuating stray transmission of UV light between adjacent pixels 184 (shown in FIG. 7). In other embodiments, walls 583 may be formed from other materials.

Figure 16:
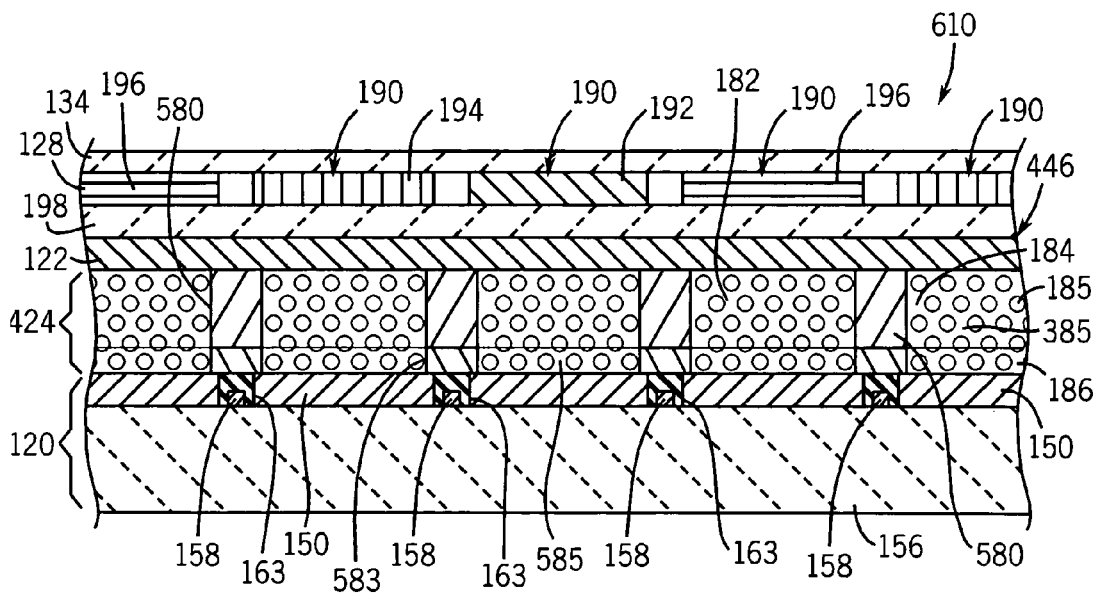
FIG. 16 is a fragmentary sectional view of another embodiment of the display system of FIGS. 4-10 including the grid of FIG. 15 according to an example embodiment.

FIG. 16 is a sectional view schematically illustrating display system 610, another embodiment of display system 110 (shown and described with respect to FIGS. 4 and 7). Display system 610 is similar to display system 110 except that display system 610 includes grid 580 in lieu of grid 180. Those remaining elements of display system 610 which correspond to system 110 are numbered similarly. Although not shown in FIG. 16, display system 610 additionally includes UV light source 114, diffuser 116 and frame 136 shown in FIG. 4.

As shown by FIG. 16, grid 580 is sandwiched between electrode matrix 120 and electrode 122 while containing PDLC 182. In the particular example illustrated, walls 383 are formed directly upon electrode 122, using electrode 122 as a substrate during the formation of grid 580. As compared to grid 580 shown in FIG. 15, grid 580 employed in display 610 is inverted. As a result, PDLC 182, filling wells 385, is in direct contact with electrode 122, allowing a stronger field to be created across PDLC 182 with a lesser voltage.

In other embodiments, walls 383 may alternatively be formed upon another transparent substrate, such as glass, wherein the substrate is positioned against electrode 122. In such an embodiment, the additional substrate may be configured so as to minimally interfere with the application of electric field across PDLC 182 by electrode 122 and electrode matrix 120. In still other embodiments, walls 383 may be formed upon another substrate, wherein the other substrate is removed prior to incorporation of grid 580 between electrode matrix 120 and electrode 122.

As further shown by FIG. 16, walls 583 project from walls 383 to form troughs 585. Walls 583 extend generally opposite to breaks 163 of electrode matrix 120. As a result, grid 580 partitions PDLC 182 into pixels 184 which are substantially aligned with electrodes 150 of electrode matrix 120 and with pixels 190 of photo luminescent matrix 128. Like grid 380, grid 580 absorbs near-UV light to substantially attenuate undesirable transmission of near-UV light between adjacent wells 385 and between adjacent pixels 184.

Although FIG. 16 illustrates grid 580 as being formed upon electrode 122, in other embodiments, grid 580 may alternatively be formed upon electrode matrix 120. In such an embodiment, walls 583 extend above walls 583 opposite to electrode 122. In still other embodiments, grid 580 may be provided upon electrode 122 while omitting walls 583.

Overall, grids 180, 380 and 580 absorb near-UV light to attenuate undesirable transmission of stray near-UV light between adjacent wells and between adjacent pixels of a display. As a result, contrast ratio and color purity of the display may be enhanced. Because grids 380 and 580 are formed from a dyed negative resist polymer, grids 380 and 580 may be formed or fabricated in a precise and efficient manner at a reduced cost. Because grid 580 additionally includes troughs 585, wicking of optical charge responsive material, such as PDLC 182, is enhanced to further facilitate fabrication of displays using grid 580.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A display comprising:
   a grid forming wells, the grid being configured to absorb ultra-violet radiation, wherein each well has a depth of less than or equal to about 20 μm, wherein the wells have a top edge and wherein the display further comprises at least one trough next to the wells, the at least one trough including a pair of substantially parallel opposing continuous walls extending next to a pair of consecutive wells and a floor partially provided by the top edge; and
   a charge responsive optical material within each of the wells.

2. The display of claim 1, wherein the charge responsive optical material comprises a polymer dispersed liquid crystal.

3. The display of claim 1, wherein the charge responsive optical material is configured to attenuate the transmission of ultra-violet radiation in a first state and to transmit ultra-violet radiation in a second state.

4. The display of claim 1, wherein the grid and the walls of the trough are formed from at least one dyed resist polymer.

5. The display of claim 1, wherein the grid and the walls of the trough are formed from a same material.

6. The display of claim 1, wherein the grid is configured to absorb at least 60 percent of ultra-violet radiation.

7. The display of claim 1, wherein the grid is configured to absorb at least 85 percent of ultra-violet radiation.

8. The display of claim 1, wherein the grid has a thickness of at least 2 micrometers.

9. The display of claim 1, wherein the grid has a thickness of at least 4 micrometers.

10. The display of claim 1, wherein the grid has a thickness of at least 10 micrometers.

11. An apparatus comprising:
a substrate; and
a grid disposed on the substrate, the grid formed from a polymeric compound having one or more ultra-violet absorbing materials disposed therein, wherein the polymeric compound includes an epoxidized bisphenol-A/formaldehyde novolac copolymer combined with a photo acid generator, wherein the grid includes a plurality of wells having a top edge and wherein the apparatus further comprises:
a charge responsive optical material within each of the wells; and
at least one trough having opposing continuous walls next to the top edge of the wells and extending beyond the top edge, wherein the sides of the walls are next to interiors of the wells.

12. The apparatus of claim 11, wherein the grid includes wells having a depth of less than or equal to about 20 μm.

13. The apparatus of claim 12, wherein the polymeric compound is configured to absorb at least 60 percent of ultra-violet radiation.

14. The apparatus of claim 12, wherein the polymeric compound is configured to absorb at least 85 percent of ultra-violet radiation.

15. The apparatus of claim 11 further comprising a charge responsive optical material within cells of the grid.

16. The apparatus of claim 15, wherein the charge responsive optical material comprises a polymer dispersed liquid crystal.

17. The apparatus of claim 15, wherein the charge responsive optical material substantially attenuates transmission of ultra-violet radiation in a first state and transmits ultra-violet radiation in a second state.

18. The apparatus of claim 15 further comprising:
a first transparent conductor on a first side of the material; and
a second transparent conductor on a second side of the material.

19. The apparatus of claim 18 further comprising:
a near-UV light source on a first side of the charge responsive optical material; and
a photo luminescent material on a second opposite side of the charge responsive optical material.

20. The apparatus of claim 19, wherein the photo luminescent material includes pixels, each pixel corresponding to and substantially aligned with a cell of the grid.

21. The apparatus of claim 20, wherein the pixels include a first pixel configured to emit a first wavelength of a electromagnetic radiation and a second pixel configured to emit a second wavelength of electromagnetic radiation.

22. A method comprising:
forming a grid of a polymeric compound having one or more ultra-violet absorbing materials disposed therein, the grid having wells with a top edge;
forming troughs upon the grid, the troughs including a pair of substantially parallel opposing continuous walls extending next to a pair of consecutive wells; and
a floor at least partially formed by the top edge of the wells; and
at least partially filling cells of the grid with a charge responsive optical material.

23. The method of claim 22, wherein forming comprises:
forming a layer of the polymeric compound, wherein the polymeric compound is a dyed negative resist polymer;
selectively exposing the layer to ultra-violet radiation;
removing unexposed portions of the layer; and
heating remaining exposed portions of the layer.

24. The method of claim 22, wherein the polymeric compound is configured to substantially attenuate ultra-violet radiation and wherein the charge responsive optical material is configured to substantially attenuate ultra-violet radiation in a first state and to transmit ultra-violet radiation in a second state.

25. A method comprising:
emitting near ultra-violet radiation;
selectively attenuating the near ultra-violet radiation with a charge responsive optical material in wells of a grid having a height of less than or equal to about 20 μm and formed from a polymeric compound having one or more near ultra-violet radiation absorbing materials disposed therein, wherein consecutive wells are next to and bordered on opposite sides by opposite continuous walls of a trough having a floor at least partially formed by a top edge of the wells.

26. The method of claim 25 further comprising emitting visual light in response to being impinged by the near ultra-violet radiation.

27. A display comprising:
a grid forming wells having a top edge , the grid being configured to absorb ultra-violet radiation, wherein the grid is at least partially formed from a polymeric composition including an ultraviolet radiation absorbing material;
at least one trough having opposing continuous walls next to the top edge of the wells and extending beyond the top edge; and
a charge responsive optical material within each of the wells, wherein the sides of the walls are next to interiors of the wells.

28. The display of claim 27, wherein the at least one trough comprises:
a floor at least partially formed by the top edge of the wells.

29. The display of claim 27, wherein the at least one trough extends less than or equal to about 20 micrometers above the top edge of the wells.

30. The display of claim 1, wherein the opposing continuous walls have opposing side surfaces extending next to opposite sides of an interior of one of the consecutive wells.

31. The display of claim 1, wherein the opposing continuous walls have opposing side surfaces extending next to opposite sides of an interior of one of the consecutive wells.

* * * * *

UNITED STATES PATENT AND TRADEMARK OFFICE
CERTIFICATE OF CORRECTION

PATENT NO. : 7,612,859 B2  Page 1 of 1
APPLICATION NO. : 11/263525
DATED : November 3, 2009
INVENTOR(S) : Benjamin L. Clark et al.

It is certified that error appears in the above-identified patent and that said Letters Patent is hereby corrected as shown below:

In column 16, lines 50-51, in Claim 28, delete "comprises: a floor at least partially formed by the top edge of the wells." and insert -- comprises a floor at least partially formed by the top edge of the wells. --, therefor.

Signed and Sealed this

Eleventh Day of May, 2010

David J. Kappos
*Director of the United States Patent and Trademark Office*